Nov. 3, 1936.   E. C. EASTMAN ET AL   2,059,856
METHOD OF LUBRICATING COMPOSITION BEARINGS
Filed May 14, 1934   2 Sheets-Sheet 1

INVENTORS
Eugene C. Eastman
Edward R. Barnard
BY Bruce K. Brown
ATTORNEY

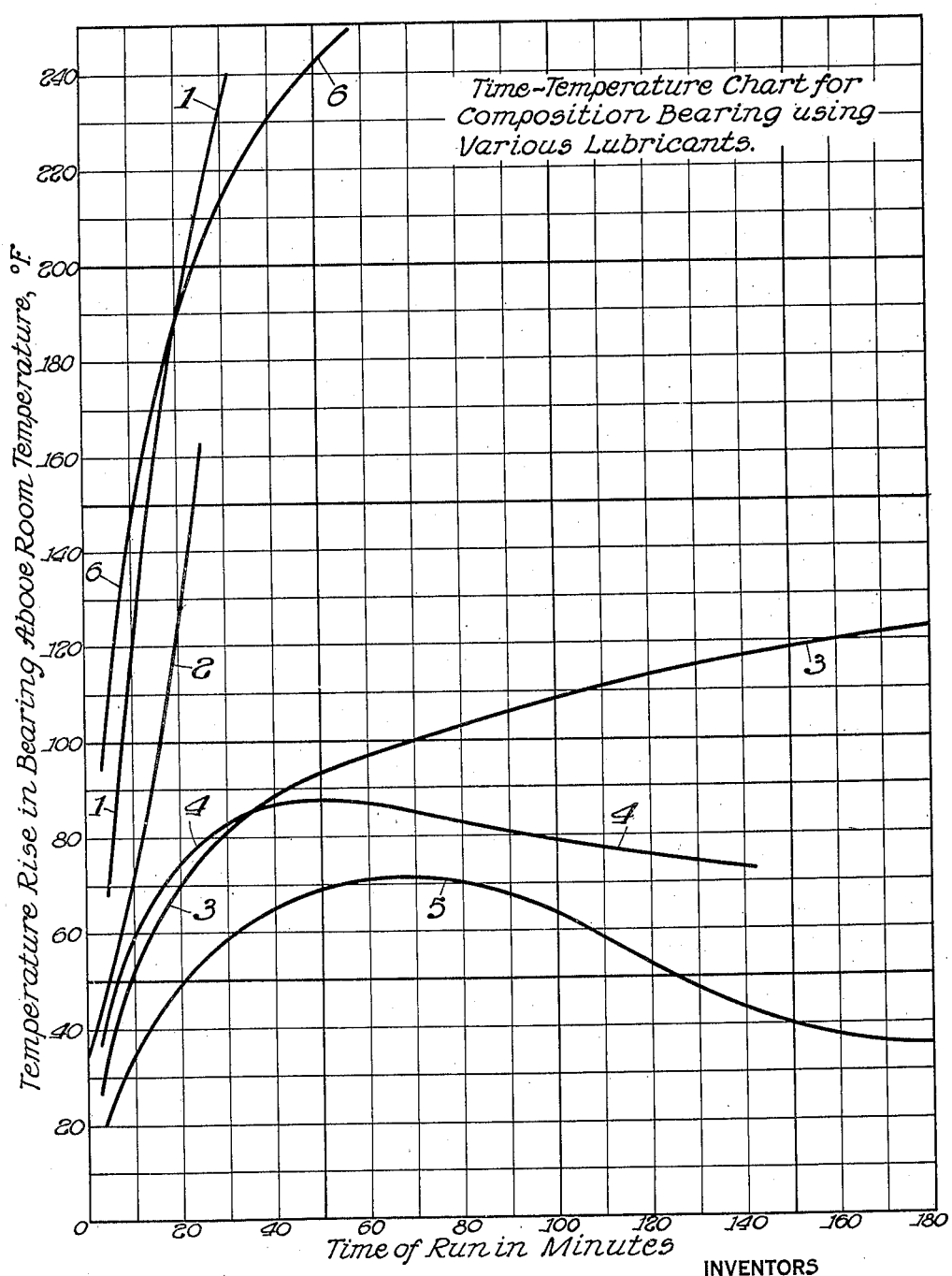

UNITED STATES PATENT OFFICE 2,059,856

METHOD OF LUBRICATING COMPOSITION BEARINGS

Eugene C. Eastman, Whiting, and Edward R. Barnard, Hammond, Ind., assignors to Standard Oil Company, Chicago, Ill., a corporation of Indiana Application May 14, 1934, Serial No. 725,426

15 Claims. (Cl. 308—241)

This invention pertains to methods and materials for the lubrication of bearings of the so-called composition type, particularly to bearings composed of the so-called synthetic resins and more particularly to bearings, either laminated or molded, composed of synthetic resins impregnated in various fillers such as paper, fabric and other fibrous materials. The invention is particularly applicable to bearings comprising synthetic resins of the phenolic condensation product type and more particularly to the phenol-formaldehyde condensation products such as "Bakelite". Commercial bearing materials, to the lubrication of which this invention is applicable, include "Tuffite", "Micarta", "Phenolite" and particularly "Ryertex", all of which contain synthetic resins of the class typified by the phenol-formaldehyde condensation products.

Composition bearings, particularly of the types above indicated, are beginning to make a very definite showing of usefulness in connection with large, slow moving machinery in heavy duty service of many kinds. In particular they have been used with great success in rolling mills such as are used in the steel and brass industries, as bearings for marine propeller shafts, as bearings for rollers such as are used in sugar mills, as bearings for pumps in heavy duty service, etc. These bearings have the advantage of durability under shock loads and ability to withstand momentary and severe vibration with complete absence of seizure between the metal parts and the composition bearing. Probably their most important advantage is their extreme long life in connection with journals operating at low speeds and/or high unit pressures, such that fluid film lubrication cannot be maintained.

It is well known that, in ordinary fluid-film lubrication, when the expression $$\frac{ZN}{P}$$

wherein Z is the kinematic viscosity of the lubricant, N is the rate of rotation of the journal and P is the unit pressure, reaches a certain critical value, the fluid film of lubricant breaks down. Beyond this point the viscosity of the lubricant is of no importance and a lubricant having a Saybolt viscosity of 1000 seconds at 210° F. is no different in its effect than one having a viscosity of 100 seconds at 100° F. These composition bearings find their chief utility under conditions such that the speed of rotation of the journal is so low and/or the unit pressure so high that fluid film lubrication cannot be maintained. These conditions will be referred to as "conditions beyond the fluid film range."

Operation under these extreme conditions introduces the very serious problem of maintaining satisfactory lubrication. It has been found that on continued operation under heavy, steady loads and/or at low speeds the temperature of the bearing surface will rise sufficiently high to cause decomposition of the bearing material. The use of ordinary lubricating oils commonly employed on metal bearings results in the above-mentioned rapid heating with ultimate failure of the bearing.

Our invention can be applied to other types of bearing as well as to journal bearings. Thus, for instance, it can be used with composition bearings in the form of needle-roller bearings, thrust bearings, sleeve bearings, plane or slipper bearings, etc., particularly beyond the fluid film range. It can also be applied to rubber bearings.

We have found that it is possible to lubricate bearings of the composition type with complete success by the use of a lubricant comprising a polyhydroxy alcohol, for instance, ethylene glycol, diethylene glycol, triethylene glycol, propylene glycol, and particularly glycerine. We are not certain what the precise reason for this property of the polyhydroxy alcohols is, although we have certain theories with regard thereto which will hereinafter be set forth.

Our invention and the new and novel results which can be obtained by the use of it can best be described in connection with certain tests which we have made using the so-called Purdue bearing testing machine. These tests will be described with particular reference to the drawings in which—

Fig. 3 shows the results of certain tests to be described hereinafter.

Figure 1:
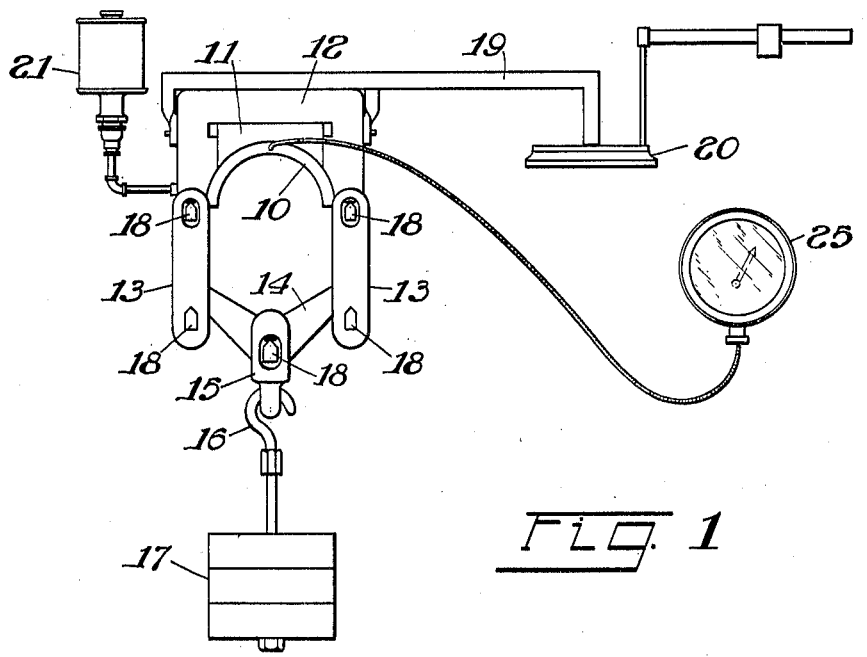
Fig. 1 shows the mounting of the test bearing.
Figure 2:
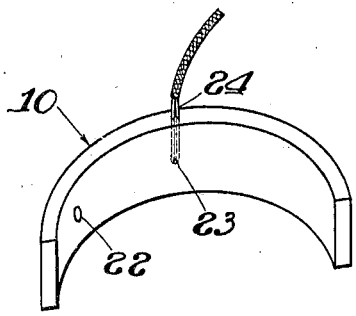
Fig. 2 shows the test bearing apart from its mounting.

Referring now more particularly to the drawings, Fig. 1 shows the mounting which, in the actual test, was carried on a hardened and polished 4⅞" steel journal, the journal being supported on each side of the test bearing mounting by metal bearings of such size as to make the unit load conditions much less severe than in the test bearing. This journal, which is not specifically shown, was arranged to be rotated at the desired speed. The bearing to be tested is shown at 10 in the drawings and was, in the case of our experiments, a 180° bearing ⅜" thick and 1½" wide, molded to a 4⅞" internal diameter. Bearing 10 was carried by a pressure block 11, which was carried in turn by a yoke 12. A load was applied to the bearing through pressure block 11, yoke 12, links 13, beam 14, stirrup 15 and hook 16, the weights themselves being indicated at 17. The weight was distributed uniformly by means of knife edges 18. The torque applied to the bearing was measured through torque arm 19 by scale 20. The lubricant was applied by means of lubricator 21 through hole 22 (see Fig. 2) in bearing 10. The temperature at the surface of the bearing was measured by thermocouple junction 23 connected to thermocouple wires 24 led into bearing 10 through the side thereof and thence to the inner surface at the center of the bearing. The temperature was read by means of potentiometer 25. The bearing 10 was arranged, of course, to ride on the journal of the testing machine aforementioned. By this means, the bearing could be tested at any desired torque and load with any desired lubricant and the temperature of the bearing could simultaneously be established.

The first tests made with the above described testing device were made at a journal speed of 180 R. P. M. corresponding to a rubbing speed of 343.8 feet per minute and a total load of 3650 pounds corresponding to a unit load of 500 pounds per square inch of projected bearing area. Various lubricants were used and the time which was required for the temperature to rise to 370° F. above room temperature was noted. Using water, an aqueous soap solution, a refined Mid-Continent lubricating oil having a Saybolt viscosity of 200 seconds at 100° F., or a blend of this oil with lard oil, the temperature at the bearing surface rose to 370° F. above room temperature in about 5 minutes. Glycerine on the other hand required about 15 minutes and an emulsion of a lubricating oil in glycerine required about 25 minutes for the same temperature rise. Thus, even under these operating conditions which were not sufficiently severe to show either the composition bearing itself or our new type of lubricant to the best advantage it was clearly indicated that glycerine was distinctly preferable to the customary lubricants and that an emulsion of oil in glycerine was still better.

Tests were then run at a rubbing speed of 33.5 feet per minute and a unit load of 1573 pounds per square inch of projected bearing area. The bearing and journal were cleaned between each of these runs. Some of the results of these tests are shown in Fig. 3 in the form of curves giving the temperature rise above room temperature at progressive time intervals during the run. The lubricants used to obtain the data shown in Fig. 3 were as follows:

Curve 1—Water.
Curve 2—Synthetic lubricating oil having a Saybolt viscosity of about 200 seconds at 210° F.
Curve 3—A mixture of 50% of the oil of curve 2 and 50% of lead soap of oil soluble petroleum sulfonic acids.
Curve 4—An emulsion of 40% of the oil of curve 2 in 60% of glycerine.
Curve 5—An oil in glycerine emulsion having the following composition:

70.00% glycerine
27.70% refined Mid-Continent lubricating oil (S. A. E. 20)
1.25% potassium animal fatty acid soap
.75% animal fatty acid
.30% water Curve 6—Same lubricant as curve 4.

It will be seen from Fig. 3 that using water as the lubricant the temperature at the surface of the bearing rose 240° F. above room temperature in 31 minutes. Using lubricating oil the temperature rose 163° F. above room temperature in 26 minutes and was still rapidly rising at the end of that time. Using a mixture of lubricating oil and lead soap somewhat better results were obtained but at the end of 180 minutes the temperature had risen 123° F. above room temperature and was still rising. These results are in sharp contrast with the results obtained using an emulsion of lubricating oil in glycerine as shown in curve 4. In this case the temperature rose to a maximum of 88° F. above room temperature in 50 minutes and then tapered off to an approximate equilibrium of 73° F. above room temperature after about 140 minutes. The coefficient of friction in this case under equilibrium conditions was only 0.009. Still better results were obtained with the emulsion used in curve 5. The maximum temperature rise in this case being 72° F. above room temperature and the equilibrium rise 35° F. above room temperature. The equilibrium coefficient of friction in this latter case reached the exceedingly low figure of 0.0054. Curve 6 will be discussed hereinafter.

Further tests were made using the lubricant of curve 5 at a rubbing speed of 66.9 feet per minute under the same load. The equilibrium temperature rise in this case was 70° F. above room temperature. A 78 hour test was made using this same lubricant under the same load at a rubbing speed of 114.6 feet per minute and the temperature did not rise above about 148° F. above room temperature. In this latter case the coefficient of friction under equilibrium conditions was 0.0068.

The lubricant of curve 5 is our preferred lubricant. It can be made by heating glycerine, adding the fatty acid (equivalent to both the free fatty acid and the fatty acid component of the soap), then adding the caustic to form the soap and finally grading in the oil—slowly at first—with violent agitation. Other methods of producing emulsions of oils in glycerine or other polyhydroxy alcohols or mixtures of polyhydroxy alcohols can be used. It is important, however, that the polyhydroxy alcohol should form the external or continuous phase and the oil the internal or discontinuous phase rather than vice versa, although this is not absolutely necessary. It will also be understood that the glycerine or other polyhydroxy alcohol or mixture of polyhydroxy alcohols can be used alone or in various other compositions.

Our preferred lubricant comprises from about 30% to about 95% of polyhydroxy alcohol or mixture of polyhydroxy alcohols and from about 5% to about 70% of lubricating oil. The polyhydroxy alcohol portion of this composition may contain a minor amount, say up to at least about 50%, of water, and/or monohydroxy alcohol without departing from our invention. In general it is necessary to use an emulsifying agent in order to retain the oil in the internal phase.

In connection with our work on the lubrication of composition bearings we also discovered that unfavorable results were obtained even with our preferred lubricants in the case of new bearings and in the case of bearings which had been previously lubricated with a composition comprising lead soaps. We found that the unfavorable results in these cases could be obviated by "running in" the bearing with an alkaline solution. Thus, for instance, a solution of from about 1% to about 20% of the hydroxide, carbonate or bicarbonate of sodium, potassium or ammonium can be used. We prefer to use a solution of about 5% of sodium hydroxide. This solution can be made up in water and will make a satisfactory "run-in" material but it is much more satisfactory to use a solution of the alkaline material in a solution containing at least about 20% and preferably at least about 40% of glycerine and/or other polyhydroxy alcohol or mixtures of polyhydroxy alcohols.

One highly satisfactory "run-in" solution which we have used is composed of 50% glycerine, 45% water and 5% sodium hydroxide. This solution should be fed quite rapidly so that it will wash out of the bearing any deposit loosened from it. After from 1 to 10 hours, preferably about 4 hours, of running with this solution the bearing is ready to be lubricated with one of our preferred lubricants.

The importance of this running in is shown by comparison of curves 4 and 6 of Fig. 3. The data plotted in curve 4, as is also true of the data plotted in curves 1, 2, 3 and 5, were obtained on bearings which had already been run in. The data of curve 6, on the other hand, were obtained on a new bearing and the difference in result is clearly apparent.

We have tested our new lubricants and run-in solutions on composition bearings containing graphite and on those not containing graphite and find no appreciable difference in the relations to the lubricants.

As previously stated, we are not aware just wherein the correct explanation for the peculiar efficacy of the polyhydroxy alcohols in connection with the lubrication of composition bearings lies. We believe however, that it may be due in part to the relatively high heat capacity of these substances which enables them to carry away the heat generated by the bearing. This alone, however, does not account for the superiority of these lubricants over lubricating oils and in particular it does not account for their superiority over water. The viscosity factor cannot account for this difference since the lubrication conditions are beyond the fluid film range.

We believe that the efficacy of our lubricants may be due to their ability to "wet" the material of the composition bearings and particularly to the ability of the composition bearing material to adsorb and tenaciously hold a mono-molecular or very thin film of lubricant molecules which serves to reduce the co-efficient of friction and thereby eliminate excessive heating.

The percentages of various ingredients given in the specification and claims are on a weight basis.

While we have described our invention in connection with certain specific embodiments thereof and in connection with certain theories of operation, these are by way of illustration rather than by way of limitation and we do not mean to be restricted thereby but only to the scope of the appended claims in which we have set forth the novel features of our invention.

We claim:

1. A method of lubricating a composition bearing containing a synthetic resin of the class typified by the phenol-formaldehyde condensation products, comprising applying a polyhydroxy alcohol to the bearing surface.

2. A method of lubricating the bearing surface between a composition bearing containing a synthetic resin of the class typified by the phenol-formaldehyde condensation products, and a metal journal comprising applying an emulsion of lubricating oil in a polyhydroxy alcohol to said surface.

3. A method of lubricating the bearing surface between a bearing of the phenol condensation product type and a metal journal under conditions beyond the fluid film range comprising applying glycerine to said surface.

4. A method of lubricating a composition bearing containing a synthetic resin, comprising applying to the bearing surface a polyhydroxy alcohol selected from the group consisting of ethylene glycol, diethylene glycol, triethylene glycol, propylene glycol and glycerine.

5. A method of running in a composition bearing containing a synthetic resin of the class typified by the phenol-formaldehyde condensation products, comprising applying an alkaline solution thereto.

6. A method of running in a composition bearing containing a synthetic resin of the class typified by the phenol-formaldehyde condensation products comprising applying thereto a solution comprising from about 1% to about 20% of an alkaline material dispersed in a liquid containing at least about 20% of a polyhydroxy alcohol.

7. A method of running in a composition bearing containing a synthetic resin, comprising applying thereto a solution of an alkaline material selected from the group consisting of the hydroxides, carbonates and bicarbonates of sodium, potassium and ammonium.

8. A method of running in a composition bearing containing a synthetic resin, comprising applying thereto a solution containing a polyhydroxy alcohol and an alkaline material selected from the group consisting of the hydroxides, carbonates and bicarbonates of sodium, potassium and ammonium.

9. A method of running in and lubricating a composition bearing containing a synthetic resin of the class typified by the phenol-formaldehyde condensation products comprising first applying an alkaline solution to the surface between said bearing and a metal journal and then applying a lubricant comprising a polyhydroxy alcohol to said surface.

10. A method of running in and lubricating a composition bearing containing a synthetic resin of the class typified by the phenol-formaldehyde condensation products, comprising first applying an alkaline solution to the surface between said bearing and a metal journal and then applying an emulsion of lubricating oil in a polyhydroxy alcohol to said surface.

11. A method of running in and lubricating a composition bearing containing a synthetic resin of the class typified by the phenol-formaldehyde condensation products comprising first applying an alkaline solution to the surface between said bearing and a metal journal and then applying a lubricant comprising glycerine to said surface.

12. A new article of manufacture comprising a synthetic resin bearing and a very thin film of polyhydroxy alcohol adsorbed on said synthetic resin bearing.

13. A new article of manufacture comprising a phenol condensation product bearing and a mono-molecular film of polyhydroxy alcohol adsorbed on the surface of said bearing.

14. A new article of manufacture comprising a synthetic resin bearing and a very thin film of a polyhydroxy alcohol selected from the group consisting of ethylene glycol, diethylene glycol, triethylene glycol, propylene glycol and glycerine adsorbed on the surface of said synthetic resin bearing.

15. A new article of manufacture comprising a synthetic resin bearing and a very thin film of glycerine adsorbed on said synthetic resin bearing.

EUGENE C. EASTMAN.
EDWARD R. BARNARD.